Patented Oct. 11, 1949

2,484,056

UNITED STATES PATENT OFFICE 2,484,056

PROCESS FOR PRODUCING 2,2-BIS-(4-METH-OXYPHENYL)-1,1,1-TRICHLOROETHANE

David A. Shirley, Wilmington, Del., assignor to E. I. du Pont de Nemours & Company, Wilmington, Del., a corporation of Delaware No Drawing. Application September 26, 1946, Serial No. 699,595

4 Claims. (Cl. 260—613)

This invention relates to the manufacture of the compound 2,2-bis-(4-methoxyphenyl)-1,1,1-trichloroethane and is more particularly directed to processes for condensing anisole and chloral by mixing anisole, chloral, and anhydrous aluminum chloride in the proportions of at least 2 moles of anisole and at least 0.25 mole of anhydrous aluminum chloride for each mole of chloral to form a homogeneous liquid reaction medium containing the aluminum chloride in solution.

This application is a continuation-in-part of my copending application Serial No. 657,623, filed March 27, 1946, now abandoned.

It is an object of this invention to provide processes for obtaining 2,2-bis-(4-methoxyphenyl)-1,1,1-trichloroethane in high yield. A further object is to provide processes which do not require sub-zero reaction temperatures but may be conducted successfully at temperatures as high as 60° C. It is a still further object to provide processes which do not require the use of a hazardous diluent, such as carbon disulfide, or similar diluents. Still further objects will become apparent hereinafter.

The foregoing and other objects of the invention are attained by mixing anisole, chloral, and anhydrous aluminum chloride in the proportions of at least 2 moles of anisole and at least 0.25 mole of aluminum chloride for each mole of chloral to form a homogeneous liquid reaction medium in which the aluminum chloride is dissolved.

The invention is based on my discovery that 2,2-bis-(4-methoxyphenyl)-1,1,1- trichloroethane can be produced in yields which were heretofore unattainable by the condensation of anisole and chloral using anhydrous aluminum chloride as a condensing agent when the reaction is carried out in a medium in which the anhydrous aluminum chloride condensing agent is completely soluble and the condensing agent is present in the proportions of at least 0.25 mole per mole of chloral.

The invention is practiced in its basic form by mixing anisole and chloral in the proportions of at least 2 moles of anisole for each mole of chloral, dissolving the anhydrous aluminum condensing agent in the solution so obtained, and effecting the condensation reaction preferably with agitation and controlled temperature. I have found, however, that unless the reaction medium is further diluted, it becomes extremely viscous and difficult to handle in the usual equipment.

A suitably fluid reaction medium is maintained thruout by employing at least 1½ times the theoretical amount of anisole; that is, at least 3 moles of anisole for each mole of chloral. Of course, the excess anisole employed serves as a diluent for the reaction mass and a solvent for the product formed.

Instead of using anisole in excess of 2 moles for each mole of chloral, other organic solvents may be employed, although it is much preferred to employ anisole because its use involves handling one less reactant and because of its ease of removal from the reaction mass at the completion of the condensation.

If for some reason it is desired to use a solvent other than anisole, one may employ any organic solvent which is miscible with the anisole and chloral reactants and which therewith forms a homogeneous liquid reaction medium in which the aluminum chloride is soluble. The solvent, of course, should not interfere with the condensation reaction and should be a solvent for the product formed. Typical of such suitable solvents are diethyl ether, nitrobenzene, and nitrotoluenes.

In order to attain the significant advantages of the processes of this invention, at least 0.25 mole of anhydrous aluminum chloride should be employed for each mole of chloral. It is preferred, however, in order to realize the most economical operation and obtain yields as high as 95 per cent in short reaction times to use from about 0.4 to about 0.6 mole of anhydrous aluminum chloride for each mole of chloral. Larger amounts of the condensing agent may, of course, be used but there is no advantage since the cost is increased without improving the yield.

The reagents may be brought together by first mixing the anisole and chloral and later adding the aluminum chloride preferably in increments, or, alternatively, the aluminum chloride may first be dissolved in the anisole and the chloral added subsequently. It is undesirable to mix the aluminum chloride and chloral in the absence of anisole.

The condensation reaction of this invention may be conducted successfully at temperatures as low as 0° C. and as high as about 60° C. As a practical operating procedure, in order to obtain a product of optimum quality, rapid reaction rate, and eliminate the need for excessive refrigeration, it is preferable to conduct the condensation reaction at a temperature from about 30° C. to about 60° C.

The condensation reaction conducted according to the processes of this invention is not instantaneous but is, however, rapid when compared with most organic reactions of this nature. It is amply sufficient normally when employing a reaction temperature of about 30°–60° C. and using from about 0.4 to 0.6 mole of anhydrous aluminum chloride per mole of chloral to allow a 30-minute reaction time after all the reactants have been added. Longer reaction times should, of course, be allowed when operating at lower temperatures and when using lesser amounts of the condensing agent.

According to a preferred embodiment of the invention, anisole, chloral, and anhydrous aluminum chloride are mixed in the proportions of about 3 to 4 moles of anisole and about 0.5 mole of anhydrous aluminum chloride for each mole of chloral. A purple colored solution results. Preferably, the anhydrous aluminum chloride is added to the anisole and chloral is then added to this solution. Some heat is generated by the solution of anhydrous aluminum chloride in anisole and it is preferred that the solution be cooled during the addition of the anhydrous aluminum chloride. The rate of addition of chloral to the solution of anhydrous aluminum chloride in anisole is preferably controlled so that with the aid of an indirect cooling medium the temperature of the reaction mixture is maintained between 30° and 60° C. After all the reactants have been added, the mass is agitated for about 15 minutes or longer to permit the completion of the condensation reaction producing 2,2-bis-(4-methoxyphenyl)-1,1,1-trichloroethane.

The dark purple reaction mass thus obtained is mixed with water. Preferably, this step is carried out by adding the reaction mass slowly to a large volume of water with agitation, because of the heat of solution of reaction when the two liquids are mixed during this washing step. The purple color of the reaction mass disappears. There results an organic liquid comprising a solution of the product in anisole and a non-miscible aqueous solution of aluminum chloride. The separation of these immiscible liquids is readily effected by any of the conventional methods.

After separation, the organic layer may be washed repeatedly with water or slightly alkaline solutions to remove impurities and then heated under vacuum to distill off the unreacted anisole. This process leaves a molten crude product. This liquid product may be granulated directly in the aqueous medium, or may be cast, ground, recrystallized or further purified by any of the conventional methods.

An alternative method for processing the reaction mass at the end of the normal reaction period comprises washing the product with water several times in order to remove as much of the impurities as possible, then subjecting the organic-water mixture to steam distillation in order to remove the excess anisole. There is thus obtained a mixture of crude 2,2-bis-(4-methoxyphenyl)-1,1,1-trichloroethane and water. With agitation and cooling, the product may be granulated directly in the aqueous medium or, alternatively, by maintaining the mixture at a temperature above the melting point of the product, the material may be separated and may be cast, ground, recrystallized, or further purified by any of the conventional methods.

The crude 2,2-bis-(4-methoxyphenyl)-1,1,1-trichloroethane prepared according to the processes set out above is a light yellow solid having a melting point which falls between about 80° C. and about 87° C., depending upon the exact conditions of the reaction and the quality of the reactants. By recrystallization of this product from such solvents as methanol, petroleum ether, and benzene, the pure white crystalline product, melting at 89° C. to 89.5° C., may be obtained.

The invention may be more fully understood by reference to the following examples.

Example 1

Thirty-three (33) parts by weight of anhydrous aluminum chloride are added to 216 parts by weight of anisole and the mixture stirred until the aluminum chloride is dissolved. Seventy-four (74) parts by weight of choral are added with agitation and occasional external cooling at such rate that the temperature of the reaction mixture is held in the range of 50-60° C. The addition requires around 30-45 minutes and there is formed a dark purple colored reaction mixture which is stirred for an additional 15 minutes after completion of the addition. The reaction mixture is then poured into excess water and stirred until the dark purple color disappears. Steam distillation of the resulting mixture gives a recovery of 117 parts by weight of anisole in the distillate. The residue remaining after steam distillation is a viscous oil. The oil is washed with dilute ammonia and several times with hot water. It is then stirred and cooled until it solidifies. The product obtained amounts to 152 parts by weight and melts at 82-4° C. This corresponds to an 88% yield based on chloral or 96% based on anisole. The product is ground and further purified by recrystallization from ethanol. Two recrystallizations yield 2,2-bis-(4-methoxyphenyl)-1,1,1-trichloroethane melting at 88-9° C.

Example 2

Two hundred (200) parts by weight of anhydrous aluminum chloride are added to 864 parts by weight of anisole over a period of 15 minutes with agitation and cooling to hold the temperature of the mixture below 35° C. To the resulting yellow solution are added, with agitation, 295 parts by weight of chloral over a period of 40 minutes, cooling being employed to keep the temperature of the reaction mixture between 30-35° C. There is formed during this addition a dark purple reaction mixture. The agitation is continued for 20 minutes after completion of the addition, no further cooling being necessary during this period. The reaction mixture is then poured with rapid mechanical stirring into 1500 parts by weight of water over a period of 15 minutes, the temperature of the mixture rising to 70-80° C. during this operation. During this step the dark purple color disappears. The aqueous mixture is then steam distilled, and 380 parts by weight of anisole (88 per cent of the excess used) is recovered in the distillate. Approximately 2700 parts by weight of water is distilled with the anisole. The resulting residue is washed twice by decantation with hot water and allowed to solidify in a shallow container. A light yellow solid is obtained, then ground, and air-dried to give 680 parts by weight (98.5 per cent yield based on chloral) of 2,2-bis-(4-methoxyphenyl)-1,1,1-trichloroethane melting at 82-4° C.

Example 3

Seventy-four (74) parts by weight of chloral are added to a solution of 23.3 parts by weight of aluminum chloride in 216 parts by weight of anisole. The temperature of the mixture during addition of the chloral is held in the range of 40-45° C. The resulting dark purple colored reaction mixture is stirred for 30 minutes after completion of the addition of the chloral. Addition of the reaction mixture to excess water followed by steam distillation gives 103.5 parts by weight of anisole in the distillate. The residue from the steam distillation is washed and allowed to solidify. The 2,2-bis-(4-methoxyphenyl) - 1,1,1 - trichloroethane obtained weighs 163 parts by weight, corresponding to a yield of 94 per cent based on chloral.

I claim:

1. In a process for the manufacture of 2,2-bis-(4-methoxyphenyl)-1,1,1-trichloroethane by condensing anisole and chloral, the step comprising mixing anisole, chloral, and anhydrous aluminum chloride in the proportions of at least 3 moles of anisole and at least 0.25 mole of anhydrous aluminum chloride for each mole of chloral to form a homogeneous liquid reaction medium in which the aluminum chloride is dissolved.

2. In a process for the manufacture of 2,2-bis-(4-methoxyphenyl)-1,1,1-trichloroethane by condensing anisole and chloral, the steps comprising mixing anisole, chloral, and anhydrous aluminum chloride in the proportions of at least 3 moles of anisole and at least 0.25 mole of anhydrous aluminum chloride for each mole of chloral to form a homogeneous liquid reaction medium in which the aluminum chloride is dissolved, and agitating the solution thus formed while controlling the temperature thereof between about 0° C. to about 60° C.

3. In a process for the manufacture of 2,2-bis-(4-methoxyphenyl)-1,1,1-trichloroethane by condensing anisole and chloral, the steps comprising mixing anisole, chloral, and anhydrous aluminum chloride in the proportions of about 3 to 4 moles of anisole for about 0.4 to 0.6 mole of anhydrous aluminum chloride for each mole of chloral to form a homogeneous liquid reaction medium in which the aluminum chloride is dissolved, and agitating the solution while controlling the temperature thereof between about 30° and 60° C.

4. In a process for the manufacture of 2,2-bis-(4-methoxyphenyl)-1,1,1-trichloroethane by condensing anisole and chloral, the steps comprising first bringing together the ingredients, anisole, chloral, and anhydrous aluminum chloride by adding the chloral to a solution of the aluminum chloride in anisole, said ingredients being in the proportions of at least about 3 to 4 moles of anisole and about 0.4 to 0.6 mole of anhydrous aluminum chloride for each mole of chloral, to form a homogeneous liquid reaction medium, then agitating the solution while controlling the temperature thereof between about 30° and 60° C. to form the product 2,2-bis-(4-methoxyphenyl)-1,1,1-trichloroethane in solution in the reaction mass, mixing the reaction mass with water, separating the organic layer and heating the organic layer under vacuum to remove excess anisole.

DAVID A. SHIRLEY.

REFERENCES CITED

The following references are of record in the file of this patent:

Frankforter et al.: "J. Am. Chem. Soc.," vol. 36, pages 1511–1529 (1944).

Elbs: "Jour. für Praktische Chemie," vol. 47, page 68 (1893).

Fritsch et al.: "Annalen der Chemie," vol. 306, page 77 (1899).

Prill et al.: "Science," vol. 101, pages 464–465 (1945).

Harris et al.: "Jour. Am. Chem. Soc." vol. 48 (1926), pages 3144–3150.

Thomas: "Anhydrous Aluminum Chloride in Organic Chemistry" (1941), pages 24–26, Reinhold, N. Y., publisher.

Callaham: "Chem. and Met.," vol. 51 (1944), page 114.